J. CHUM & G. A. FISHER.
GRAIN SEPARATOR.
No. 43,478.                    Patented July 12, 1864.
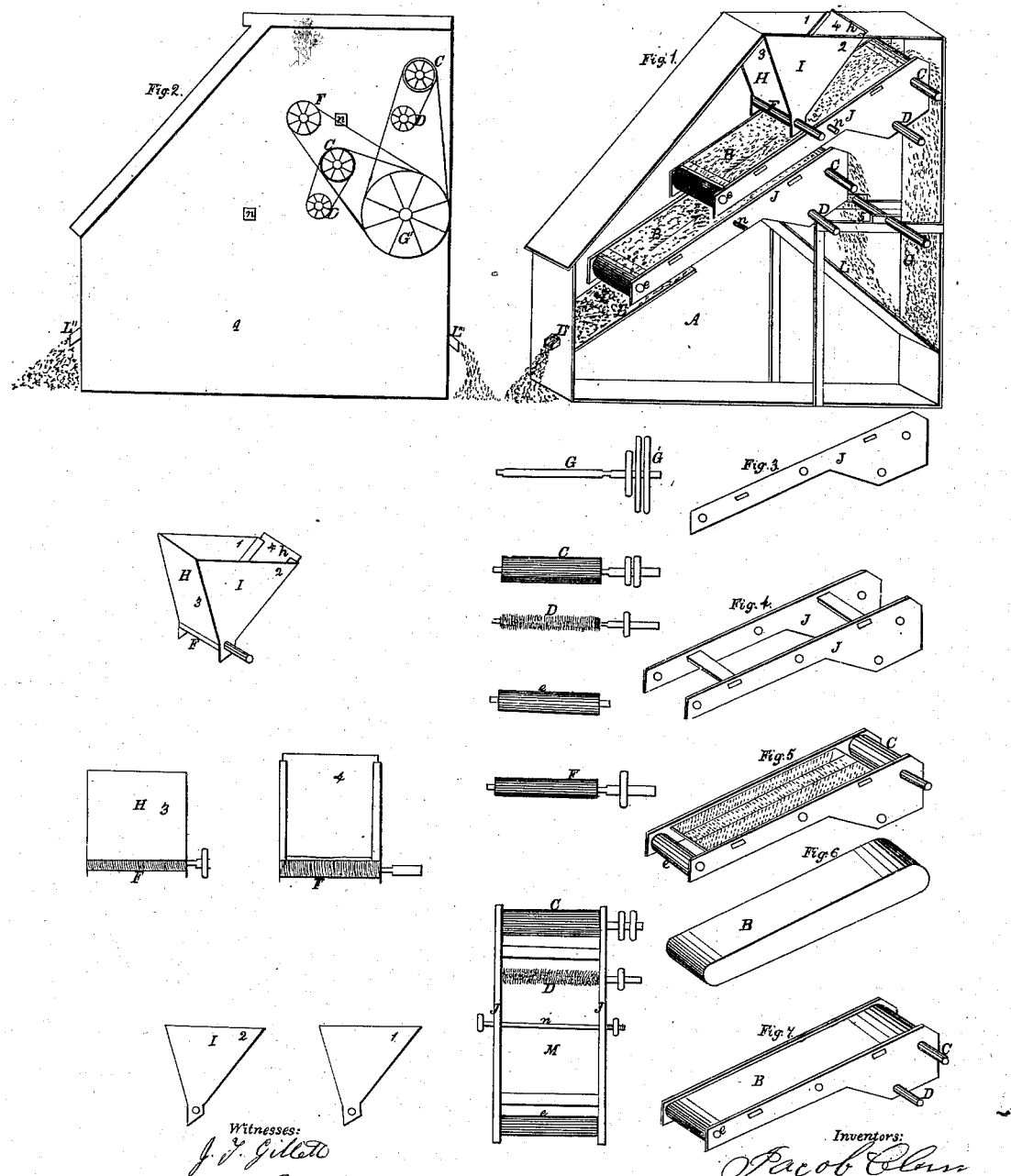

UNITED STATES PATENT OFFICE.

JACOB CLUM, OF SHELBY, AND GEORGE A. FISHER, OF ALABAMA, N. Y.

GRAIN-SEPARATOR.

Specification forming part of Letters Patent No. 43,478, dated July 12, 1864

*To all whom it may concern:*

Be it known that we, JACOB CLUM, of the town of Shelby, in the county of Orleans and State of New York, and GEORGE A. FISHER, of the town of Alabama, in the county of Genesee and State of New York, have invented a new and Improved Machine for Cleaning or Separating Grain; and we do hereby declare the following to be a full, clear, and exact description of the construction and operation thereof, reference being had to the accompanying drawings, making part of this specification, and to the letters of reference marked thereon.

To enable others skilled in the art to make and use our invention, we will proceed to describe its construction and operation.

Figure 1 is a perspective view of our machine having one of its sides removed, so as to exhibit the internal arrangement of its parts. Fig. 2 is a side elevation showing the manner of connecting and operating the mechanism. The remaining figures are detailed views of the various parts of the machine shown separately.

In all the figures similar letters indicate corresponding parts.

A in Figs. 1 and 2 represents the case of the machine, which may be made of any desired size and shape. This case is provided with a hopper, I, located in its upper portion, into which the grain is put in the usual manner, the hopper being provided with a roller, F, in its throat at the bottom for feeding out the grain, a slide, 4, forming one side of the hopper and being made adjustable, by which the flow of the grain is regulated. Underneath the hopper is located a series of two or more endless belts, occupying with their frames the entire width of the machine. These belts B are mounted in frames J, the construction of which is clearly shown in Figs. 3, 4, 5, and 7, which frames are provided with a roller, C, at each end, around which the belt B passes, and by the rotation of which the belts are moved, as indicated by the arrows in Fig. 2. The frames J are pivoted at their center upon the rod N, by which means they and the belt B can be adjusted at any desired angle. The upper ends of these frames J have their side pieces made wider for the purpose of providing a bearing for a revolving brush, D, which is so located that it shall come in contact with the surface of the belt B after the latter has passed around the upper roller, C, and is returning toward the roller e at the lower end of the frame, as shown in Figs. 1 and 7. Underneath the belts are placed two inclined division or chute boards, L and L', as shown in Fig. 1. The board L' is placed under the lower end of the lower belt, B, and is inclined in the same direction as the belt. The other board L' is placed under the upper end of said belts, and is inclined in an opposite direction.

G, Fig. 1, represents the main shaft of the machine, from which the rollers C, D, and F are driven by means of pulleys and belts, as shown in Fig. 2, or in any other suitable manner. By applying a crank to the shaft G, the machine may be operated by hand; or, if desired, it may be driven by power in the usual manner.

The operation of our invention is as follows: The grain to be cleaned is placed in the hopper I, from whence it is fed by the roller F onto the first or upper belt, which is adjusted at such an angle as to cause the kernels of grain to roll down the same, and from thence fall onto the lower belt, down which it also passes onto chute-board L' and is discharged through spout L" into a proper receptacle. While this is being done, the chaff and all other material of less specific gravity or weight than the kernels of grain will adhere to the surface of the belts and be carried therewith up over the upper roller, C, where most of it falls down onto the chute-board L, all that remains attached to the belt after thus passing over roller C being brushed off by the revolving brush D as soon as it comes in contact therewith, it being understood that the brushes D revolve in a direction opposite to that in which the under portion of the belts B move. By these means a very cheap and efficient machine is produced, by which the grain can be effectually and rapidly cleaned without the use of a blast or current of air, and by the simple application of the well known laws or principles of gravitation and adhesion.

Having thus described our invention, its construction, and operation, what we claim as new, and desire to secure by Letters Patent, is—

1. Cleaning or separating grain by means of two or more endless belts, substantially as shown.

2. Mounting the belts in such a manner that they can be inclined to a greater or less angle, substantially in the manner shown, when used for the purpose herein set forth.

3. In combination with the endless belts B, the revolving brush D, when the parts are arranged to operate as and for the purpose above set forth.

JACOB CLUM.
GEORGE A. FISHER.

Witnesses:
C. B. FAIRMAN,
O. HEUTH.